UNITED STATES PATENT OFFICE.

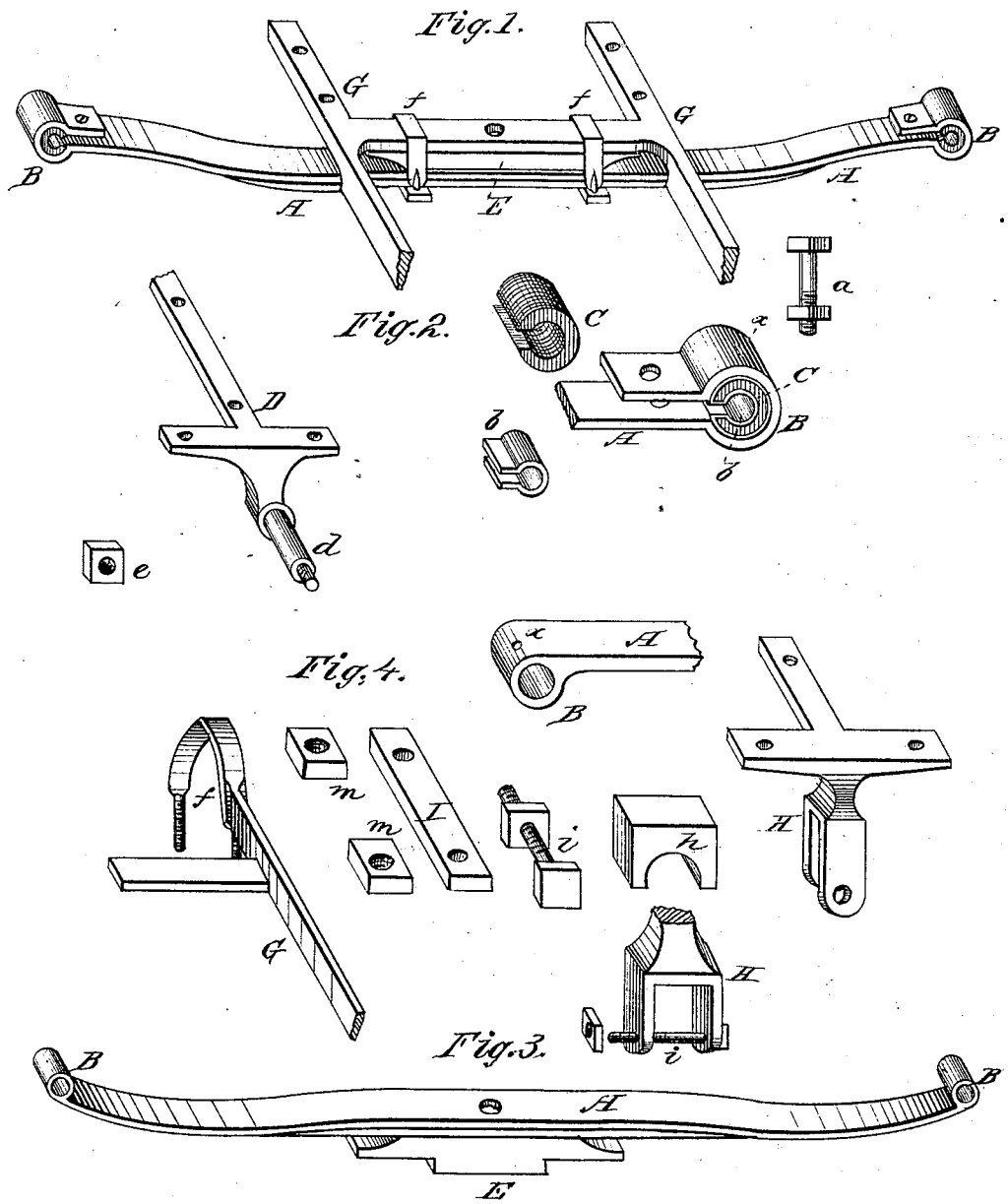

EDWIN CHAMBERLIN, OF TROY, NEW YORK, ASSIGNOR OF TWO-THIRDS HIS RIGHT TO LEE CHAMBERLIN AND EDWARD CHAMBERLIN, OF SAME PLACE.

IMPROVEMENT IN VEHICLE-SPRINGS.

Specification forming part of Letters Patent No. 167,068, dated August 24, 1875; application filed February 24, 1875.

*To all whom it may concern:*

Be it known that I, EDWIN CHAMBERLIN, of Troy, in the county of Rensselaer and State of New York, have invented certain new and useful Improvements in Side-Spar Wagons; and I do hereby declare the following to be a full, clear, and exact description thereof, reference being had to the accompanying drawing and to the letters of reference marked thereon.

My invention is intended as an improvement upon the Letters Patent, No. 151,274, granted to me May 26, 1874; and has for its object to produce a wagon possessing the advantages of being hung low, made light and stylish as the ordinary side-spar wagon, and still give the ease of riding obtained in wagons not possessing the above-mentioned advantages; or, in other words, to make the side-spar wagon ride with the ease of the end spring, and still retain the desirable points of the side spar. To this end the nature of my invention consists in the spring of a wagon, having its end curved, so as to form an eye, and provided with a perforation, in combination with a crank-loop, packing-bolt, and cross-bars, all as hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a perspective view of a carriage-spring, showing the ends curved. Fig. 2 are detailed views of the various parts connected therewith. Fig. 3 shows a modified form of the carriage-spring. Fig. 4 shows detailed view of the various parts connected with such modified form of spring.

A represents an ordinary side-spar spring, having its ends curved to form the eyes B B, which are closed or drawn tight by means of bolts $a$ $a$. Within each eye is a rubber packing, C, placed on the outside of a metal ferrule, $b$, for the purpose of forming an anti-rattling bearing, when used in connection with the shaft $d$ of the crank-loop D. This crank-loop is constructed as shown in Fig. 2, extending entirely across the body of the wagon, and is fastened thereto, the opposite end being constructed in the same manner, with a shaft, $d$, passing through the end or eye of the spring on the opposite side. The shafts $d$ are, outside of the springs, provided with nuts $e$ to hold them in place, and thereby forming a joint bearing or connection between the body of the wagon and the end of spring. Fig. 1 also shows the method of hanging the spring A under the bearing formed by the combination of the block E E, clips $ff$, and cross-bars G G, which may unite in the center, forming a solid rest or support.

In Fig. 3 I have shown the spring A fastened on top of the block E, and its ends forming eyes B. This may be used in connection with a shackle, H, with T-shaped rest for the body of the wagon, and provided with a rubber-block, $h$, and bolt $i$, thereby forming an anti-rattling connection or joining of the springs with the body of the carriage. The cross-bar G in Fig. 4 is shown as made solid to the clip $f$, which may be fastened to the side spar by the bar I and nuts $m$ $m$. The eyes B of the springs are provided with holes $x$ for oiling purposes.

Having thus fully described my invention, what I claim as new, and desire to secure by Letters Patent, is—

The end B of the spring A of a wagon, curved so as to form an eye, and provided with perforation $x$, in combination with the crank-loop D, packing C and $b$, bolt $a$, and cross-bars G, all constructed and arranged substantially as and for the purposes set forth.

EDWIN CHAMBERLIN.

Witnesses:
JOSEPH NORWOOD,
HENRY CLARY.